United States Patent
Maggi et al.

(10) Patent No.: US 12,526,031 B2
(45) Date of Patent: Jan. 13, 2026

(54) BEAM CONFIGURATION OPTIMIZATION

(71) Applicant: Nokia Solutions and Networks Oy, Espoo (FI)

(72) Inventors: Lorenzo Maggi, Massy (FR); Suresh Kalyanasundaram, Bangalore (IN); Deepak Kumar Nayak, Bangalore (IN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 19/112,301

(22) PCT Filed: Sep. 16, 2022

(86) PCT No.: PCT/EP2022/075785
§ 371 (c)(1),
(2) Date: Mar. 17, 2025

(87) PCT Pub. No.: WO2024/056190
PCT Pub. Date: Mar. 21, 2024

(65) Prior Publication Data
US 2025/0260467 A1    Aug. 14, 2025

(51) Int. Cl.
*H04B 17/318*    (2015.01)
*H04B 7/06*    (2006.01)

(52) U.S. Cl.
CPC ....... *H04B 7/06952* (2023.05); *H04B 17/318* (2015.01)

(58) Field of Classification Search
CPC ..... H04B 7/0452; H04B 7/0695; H04B 7/088
See application file for complete search history.

(56) References Cited

U.S. PATENT DOCUMENTS

| | | | |
|---|---|---|---|
| 11,425,591 B1 | 8/2022 | Maggi et al. | |
| 11,546,040 B2 | 1/2023 | Nayak et al. | |
| 2021/0083737 A1* | 3/2021 | Capdevielle | ......... H04B 7/0452 |
| 2021/0320709 A1* | 10/2021 | Nayak | ..................... G06N 3/08 |
| 2022/0149921 A1* | 5/2022 | Nilsson | ................ H04B 7/0695 |

OTHER PUBLICATIONS

Mo et al., "Fair end-to-end window-based congestion control", IEEE/ACM Transactions on Networking, vol. 8, No. 5, Oct. 2000, pp. 556-567.
Nemhauser et al., "An analysis of approximations for maximizing submodular set functions—I", Mathematical Programming, vol. 14, 1978, pp. 265-294.
International Search Report and Written Opinion received for corresponding Patent Cooperation Treaty Application No. PCT/EP2022/075785, dated Apr. 11, 2023, 11 pages.

* cited by examiner

*Primary Examiner* — Khalid W Shaheed
(74) *Attorney, Agent, or Firm* — McCarter & English LLP (57) ABSTRACT

Beam configuration optimization is disclosed. A network node device may determine a grid of beams. The grid of beams is determined to maximize a fairness function of an estimated received power of at least two of the beams of the grid of beams that are optimal for each client device of a plurality of client devices.

16 Claims, 7 Drawing Sheets

BEAM CONFIGURATION OPTIMIZATION

RELATED APPLICATION

This application claims benefit of priority from International Patent App. No. PCT/EP2022/075785, filed Sep. 16, 2022, the disclosure of which is hereby incorporated in its entirety by reference herein.

TECHNICAL FIELD

The disclosure relates generally to communications and, more particularly but not exclusively, to beam configuration optimization.

BACKGROUND

In wireless communication networks, and in particular fifth generation (5G) new radio (NR) wireless networks, optimization of beams, for example used in Massive MIMO-based air interface technologies, can give significant performance improvement.

SUMMARY

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

According to a first aspect, a network node device comprises: at least one processor; at least one memory including computer program code; and the at least one memory and the computer program code configured to, with the at least one processor, cause the network node device to perform operations comprising: determining a grid of beams, wherein the grid of beams is determined to maximize a fairness function of an estimated received power of at least two of the beams of the grid of beams that are optimal for each client device of a plurality of client devices.

According to an embodiment of the first aspect, the fairness function comprises, for each client device, a cross-beam fairness function of the estimated received power of the at least two beams of the grid of beams that are optimal for the client device.

According to an embodiment of the first aspect, the cross-beam fairness function is an α-fairness function.

According to an embodiment of the first aspect, an α parameter of the cross-beam α-fairness function is equal to 0, and wherein the cross-beam fairness function comprises a sum of the estimated received power of the at least two beams of the grid of beams that are optimal for the client device.

According to an embodiment of the first aspect, the fairness function comprises a cross-device fairness function of the cross-beam fairness function for each client device of the plurality of client devices.

According to an embodiment of the first aspect, the cross-device fairness function is an α-fairness function.

According to an embodiment of the first aspect, an α parameter of the cross-beam α-fairness function is equal to 1.

According to an embodiment of the first aspect, the cross-device function comprises a sum, across a plurality of azimuth and elevation quadruples, of a decibel of the cross-beam fairness function for each client device of the plurality of client devices weighted by a traffic density value in the azimuth and elevation quadruple.

According to an embodiment of the first aspect, the operations further comprise: estimating a traffic density distribution for a radio channel between the network node device and the plurality of client devices, the traffic density distribution defining the traffic density value for each azimuth and elevation quadruple of the plurality of azimuth and elevation quadruples.

According to an embodiment of the first aspect, estimating the traffic density distribution comprises: receiving, from the client devices, a plurality of reports, each report indicating a spatial direction for one of the client devices; clustering the reports; and computing the traffic density distribution based on the clustered reports.

According to an embodiment of the first aspect, the estimated received power comprises one or more of an estimated received power, or a beamforming gain.

According to an embodiment of the first aspect, the determining of the grid of beams comprises using an optimization algorithm comprising a greedy algorithm configured to sequentially add beams maximizing incremental gain.

According to an embodiment of the first aspect, the optimization algorithm comprises a policy improvement algorithm configured to iteratively choose a beam maximizing a performance of the greedy algorithm.

According to an embodiment of the first aspect, the operations further comprising: applying the grid of beams to a transceiver antenna array of the network node device.

According to an embodiment of the first aspect, the operations further comprising: generating, by the network node device, a beam dictionary, wherein the grid of beams is selected from the beam dictionary.

According to an embodiment of the first aspect, the grid of beams comprises a plurality of Synchronization Signal Block beams.

According to a second aspect, a method comprises: determining a grid of beams, wherein the grid of beams is determined to maximize a fairness function of an estimated received power of at least two of the beams of the grid of beams that are optimal for each client device of a plurality of client devices.

According to a third aspect, a computer program comprising instructions for causing a network node device to perform at least the following: determining a grid of beams, wherein the grid of beams is determined to maximize a fairness function of an estimated received power of at least two of the beams of the grid of beams that are optimal for each client device of a plurality of client devices.

DESCRIPTION OF THE DRAWINGS

The accompanying drawings, which are included to provide a further understanding of the embodiments and constitute a part of this specification, illustrate embodiments and together with the description help to explain the principles of the embodiments. In the drawings.

DETAILED DESCRIPTION

Reference will now be made in detail to embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
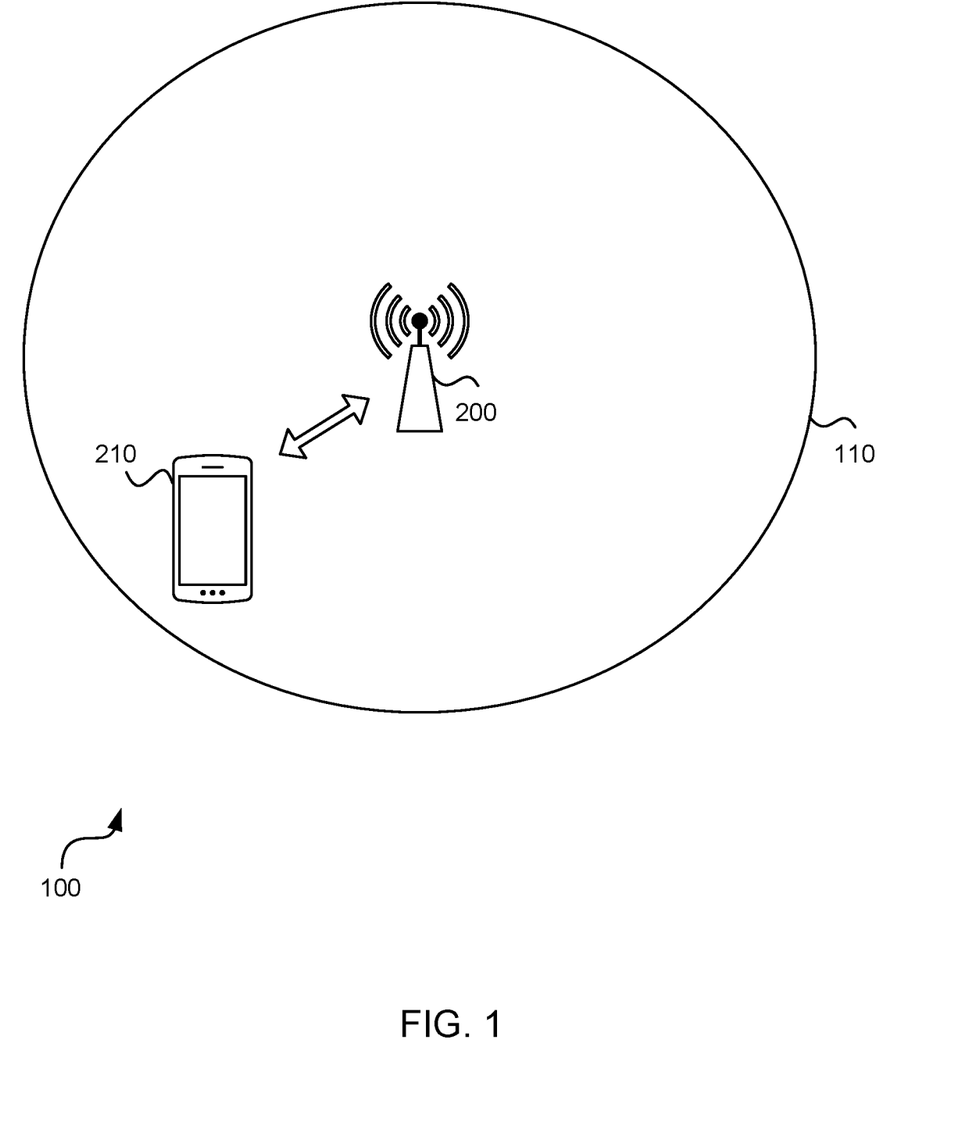
FIG. 1 shows an example embodiment of the subject matter described herein illustrating an example system, where various embodiments of the present disclosure may be implemented.

FIG. 1 illustrates an example system 100, where various embodiments of the present disclosure may be implemented. The system 100 may comprise a wireless communication network and in particularly a fifth generation (5G) new radio (NR) network 110. An example representation of the system 100 is shown depicting a client device 210 and a network node device 200. At least in some embodiments, the 5G NR network 110 may comprise one or more massive machine-to-machine (M2M) network(s), massive machine type communications (mMTC) network(s), internet of things (IoT) network(s), industrial internet-of-things (IIoT) network(s), enhanced mobile broadband (eMBB) network(s), ultra-reliable lowlatency communication (URLLC) network(s), and/or the like. In other words, the 5G NR network 110 may be configured to serve diverse service types and/or use cases, and it may logically be seen as comprising one or more networks.

The client device 210 may include, e.g., a mobile phone, a smartphone, a tablet computer, a smart watch, or any handheld, portable and/or wearable device. The client device 210 may also be referred to as a user equipment (UE). The network node device 200 may comprise a base station. The base station may include, e.g., a fifth-generation base station (gNB) or any such device suitable for providing an air interface for client devices to connect to a wireless network via wireless transmissions.

A grid of beams (or grid-of-beams) (GoB) may be used for beamforming traffic channels and/or control channels. The GoB represents a set of beams from which one or more beams may be chosen by each UE to transmit in uplink (UL). Each UE may select one or more optimal or best beams from the GoB. The selected beams may be optimal for the UE in the sense that they provide the best estimated received power (e.g., RSRP/beamforming gain) for the UE. In various implementations, the GoB needs to be determined for a plurality of UEs.

In the following, various example embodiments will be discussed. Some embodiments provide a method and/or apparatus for determining the beams to be included in the GoB.

Some embodiments improve uplink throughput. Some embodiments optimize the GoB used in 5G Massive MIMO implementation. Some embodiments enable the determination of a GoB that caters to some or all of the UEs in a radio cell. Some embodiments design the GoB beams such that it improves the overall system performance.

Some embodiments design the GoB for optimal UL performance across all the UEs in the radio cell. Some embodiments use data-driven techniques to estimate where the traffic is located in the cell. Some embodiments estimate the dominant multipaths of the UEs. Some embodiments consider up to two dominant spatial multi-path directions as an approximation to the channel. Some embodiments optimize a function of an estimated received power (e.g., RSRP/beamforming gain) of the at least two optimal beams within the GoB.

Synchronization System Blocks (SSB) beams may be used for initial access and/or receive beamforming for UL reception. In receive beamforming for UL reception, UE may report the two best beams to gNB. gNB may then use the two best beams and both polarizations to convert the antenna-space signals to 4 beamspace signals, which are then fed to a 4-Rx Interference Rejection Combining (IRC) receiver.

To guarantee high UL throughput, it may be beneficial to design, at the gNB, a GoB of SSB beams (SSB GoB) such that some or all UEs measure sufficiently high estimated received power (e.g., RSRP/beamforming gain) on the at least two optimal beams, so that the UL Received Signal to Interference & Noise Ratio (SINR) can be improved.

Some embodiments provide SSB-based UL receive beamforming technique. Some embodiments allow SSB beam pattern optimization for initial access, as well as for UL data reception. In the case of UL data reception, UE may report to gNB the at least two beams with highest estimated received power (e.g., RSRP/beamforming gain). gNB may use both beams to perform UL receive beamforming. Some embodiments optimize SSB beams for UL throughput maximization, by ensuring that the UE can find at least two SSB beams with high estimated received power (e.g., RSRP/beamforming gain).

For example, a spatial channel matrix may be approximated by the dominant direction of arrival estimated from a CRI/PMI reported by the UE. Depending on the DL rank reported by the UE, the channel matrix can be an $$\frac{n_{TRX}}{2} \times 1$$

vector or an $$\frac{n_{TRX}}{2} \times 2$$

matrix, where only the transceivers of a single polarization are considered in the approximation to the channel. The former $$\left(\frac{n_{TRX}}{2} \times 1 \text{ vector}\right)$$

occurs when the UE reports a single rank or rank-2, where the second layer is transmitted using the degree of freedom obtained from the polarization dimension. The latter $$\left(\frac{n_{TRX}}{2} \times 2 \text{ matrix}\right)$$

occurs for ranks-3 and 4, and for rank-2 when the second layer is realized using the degree of freedom in the spatial direction. For a specific UE u, these two column vectors (if the second one exists) may be denoted by $H_u^k$ for k=1,2. These two vectors can be viewed as the dominant multi-paths in the channel.

If one beam w is used at gNb and two layers are used at UE side, then gNB receives 2 signals on each polarization: $y_u^i(W):=w^H H_u^i x_u^i$ for each layer i=1,2, where $x_u^i$ is the complex symbol sent by UE u on layer i and the associated received power is $RSRP_u(w):=\|w^H H_u^1\|^2+\|w^H H_u^2\|^2$.

In the above formulation, the second polarization is ignored, because the beam pattern optimization is done in the spatial dimension, and what is optimized for one polarization is typically also optimal for the other polarization.

If two beams w,w' are used at gNb, then gNB receives 4 signals on each polarization:

$$y_u^1(w), y_u^2(w), y_u^1(w'), y_u^2(w')$$

with associated received power:

$$RSRP_u(w) + RSRP_u(w') = \|w^H H_u^1\|^2 + \|w^H H_u^2\|^2 + \|w'^H H_u^1\|^2 + \|w'^H H_u^2\|^2$$

Finally, if SSB Grid of Beams (GoB) B is used at gNb, then UE chooses the two best beams $w_u^{(best,B)}$, $w_u^{(2^{nd}best,B)}$ ∈ B guaranteeing the highest RSRP:

$$RSRP_u\left(w_u^{(best,B)}\right) \geq RSRP_u\left(w_u^{(2^{nd}best,B)}\right) \geq RSRP_u(w)$$

for any other w∈ B.

Some embodiments design the GoB B such that the UEs receive high composite RSRP across the dominant multi-paths and top-K beams, in a fair manner, with K≥1. In particular, some embodiments design the GoB B such that the UEs receive high composite RSRP across the dominant multi-paths and top-2 beams, in a fair manner.

In case of Rank1 UEs, only one direction may be estimated, hence only one beam. To estimate $H_u^2$, it may be assumed that the second layer is available in azimuth only, although there is no guarantee of achieving higher rank for such UEs.

Figure 2:
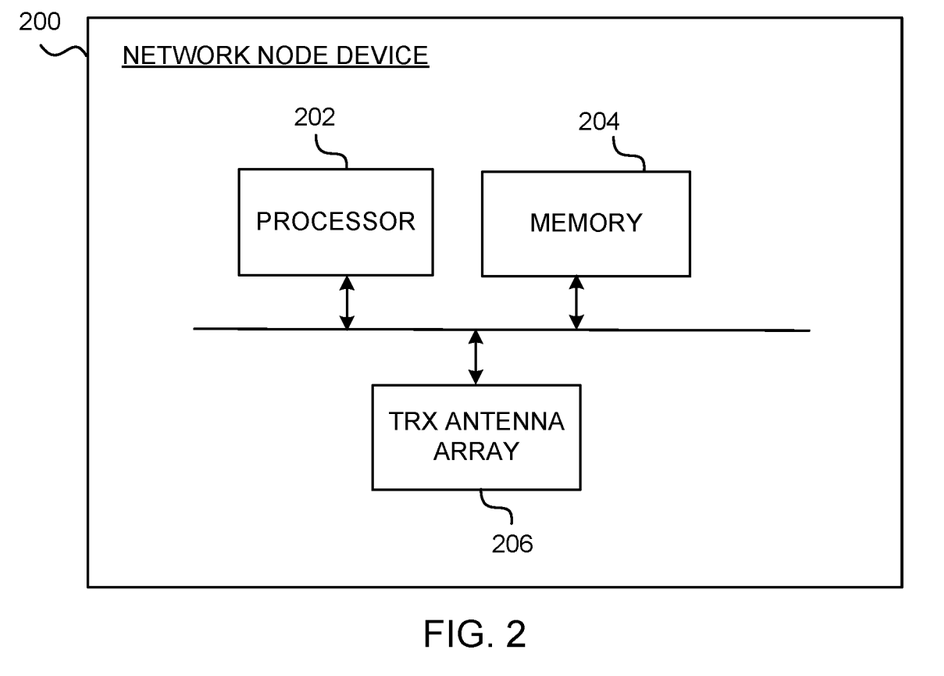
FIG. 2 shows an example embodiment of the subject matter described herein illustrating a network node device.

FIG. 2 is a block diagram of a network node device 200, in accordance with an example embodiment.

The network node device 200 comprises at least one processor 202 and at least one memory 204 including computer program code. The network node device 200 further comprises a transceiver antenna array 206 having at least two associated array split configurations.

The network node device 200 may also include other elements, such as a transceiver configured to enable the network node device 200 to transmit and/or receive information to/from other devices, as well as other elements not shown in FIG. 2. In one example, the network node device 200 may use the transceiver to transmit or receive signaling information and data in accordance with at least one cellular communication protocol. The transceiver may be configured to provide at least one wireless radio connection, such as for example a 3GPP mobile broadband connection (e.g., 5G). The transceiver may be configured to be coupled to at least one antenna of the transceiver antenna array 206 to transmit and/or receive radio frequency signals.

Although the network node device 200 is depicted to include only one processor 202, the network node device 200 may include more processors. In an embodiment, the memory 204 is capable of storing instructions, such as an operating system and/or various applications. Furthermore, the memory 204 may include a storage that may be used to store, e.g., at least some of the information and data used in the disclosed embodiments.

Furthermore, the processor 202 is capable of executing the stored instructions. In an embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 202 may be configured to execute hard-coded functionality. In an embodiment, the processor 202 is embodied as an executor of software instructions, wherein the instructions may specifically configure the processor 202 to perform the algorithms and/or operations described herein when the instructions are executed.

The memory 204 may be embodied as one or more volatile memory devices, one or more non-volatile memory devices, and/or a combination of one or more volatile memory devices and non-volatile memory devices. For example, the memory 204 may be embodied as semiconductor memories (such as mask ROM, PROM (programmable ROM), EPROM (erasable PROM), flash ROM, RAM (random access memory), etc.).

The network node device 200 may comprise a base station. The base station may include, e.g., a fifth-generation base station (gNB) or any such device providing an air interface for client devices to connect to the wireless network via wireless transmissions. At least in some embodiments, the network node device 200 may comprise a multiple-input and multiple-output (MIMO) capable network node device.

Figure 3:
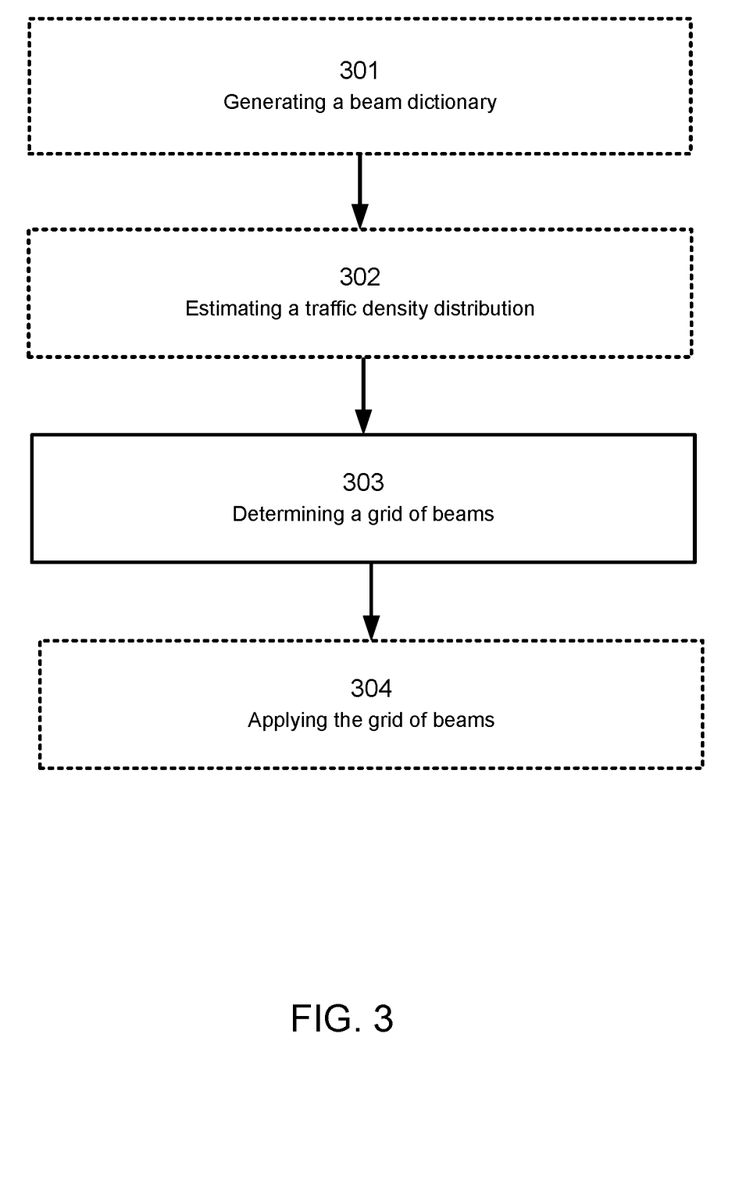
FIG. 3 shows an example embodiment of the subject matter described herein illustrating a method.
Figure 4A:
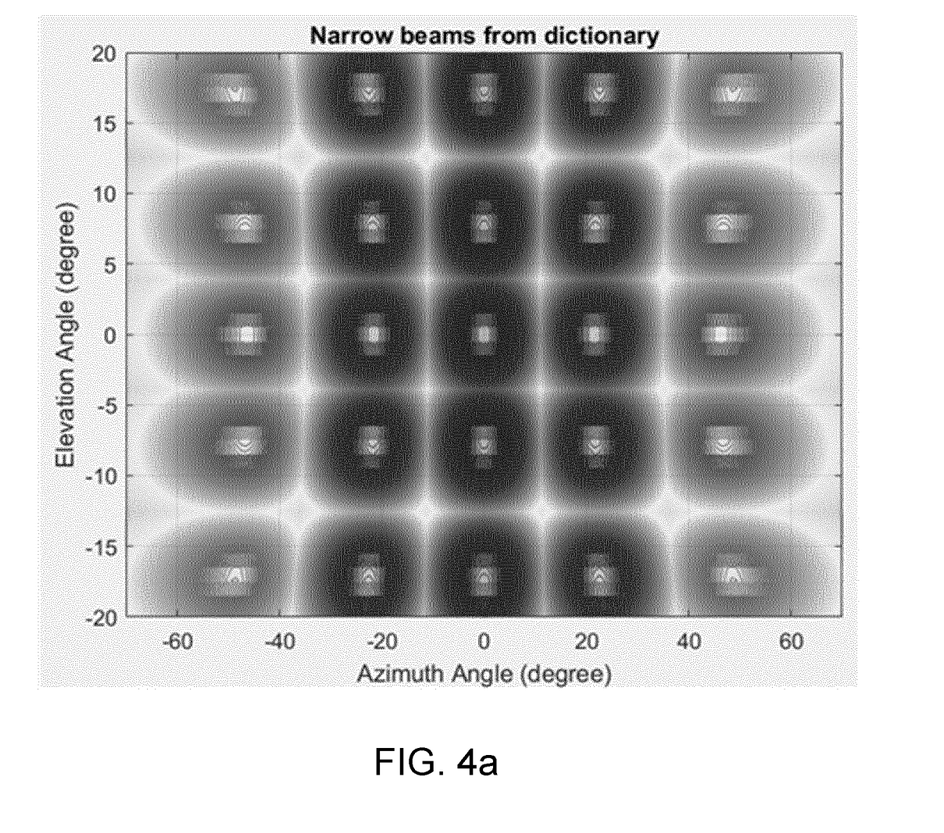
FIG. 4A is a visualization of a plurality of overlapped narrow beams from an example beam dictionary.
Figure 4B:
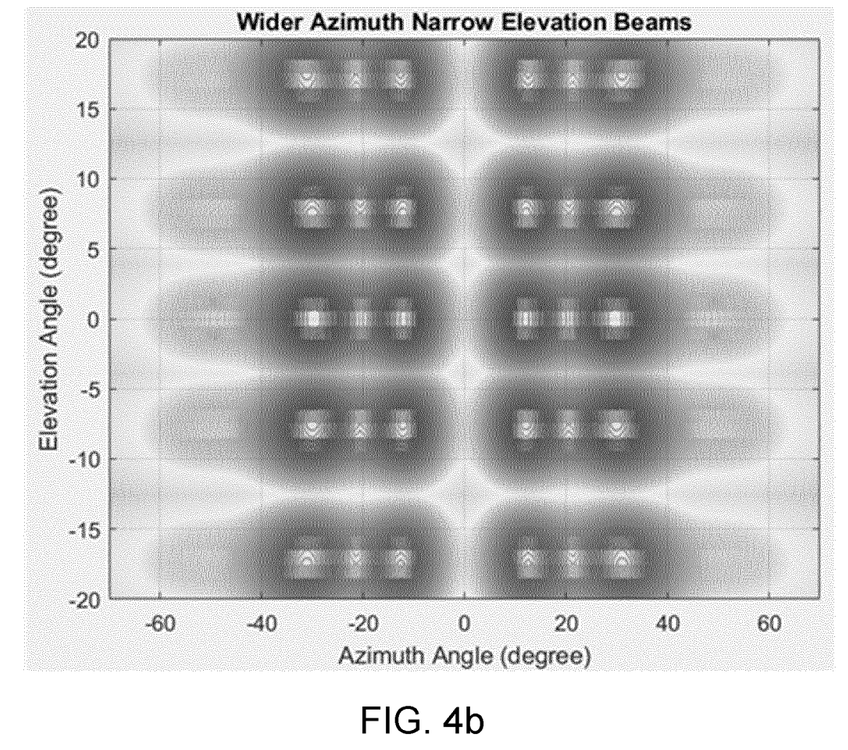
FIG. 4B is a visualization of a wider azimuth and narrow overlapped elevation beam from an example beam dictionary.
Figure 4C:
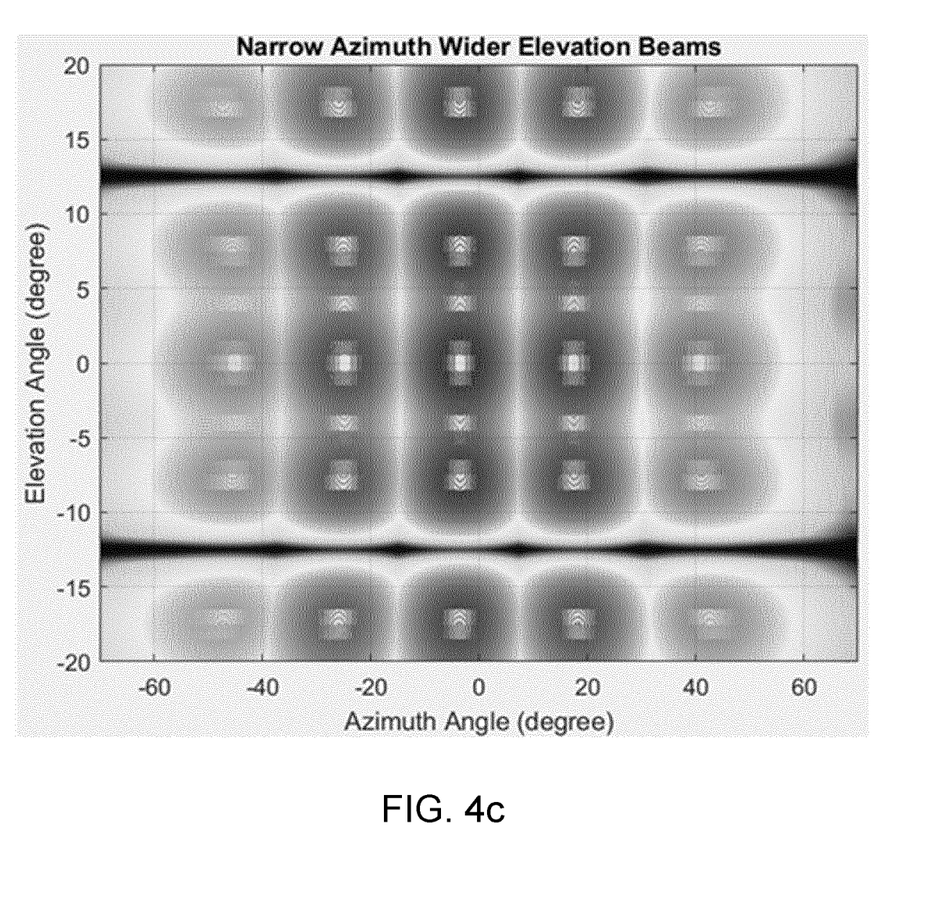
FIG. 4C is a visualization of a narrow azimuth and wider overlapped elevation beam from an example beam dictionary.
Figure 4D:
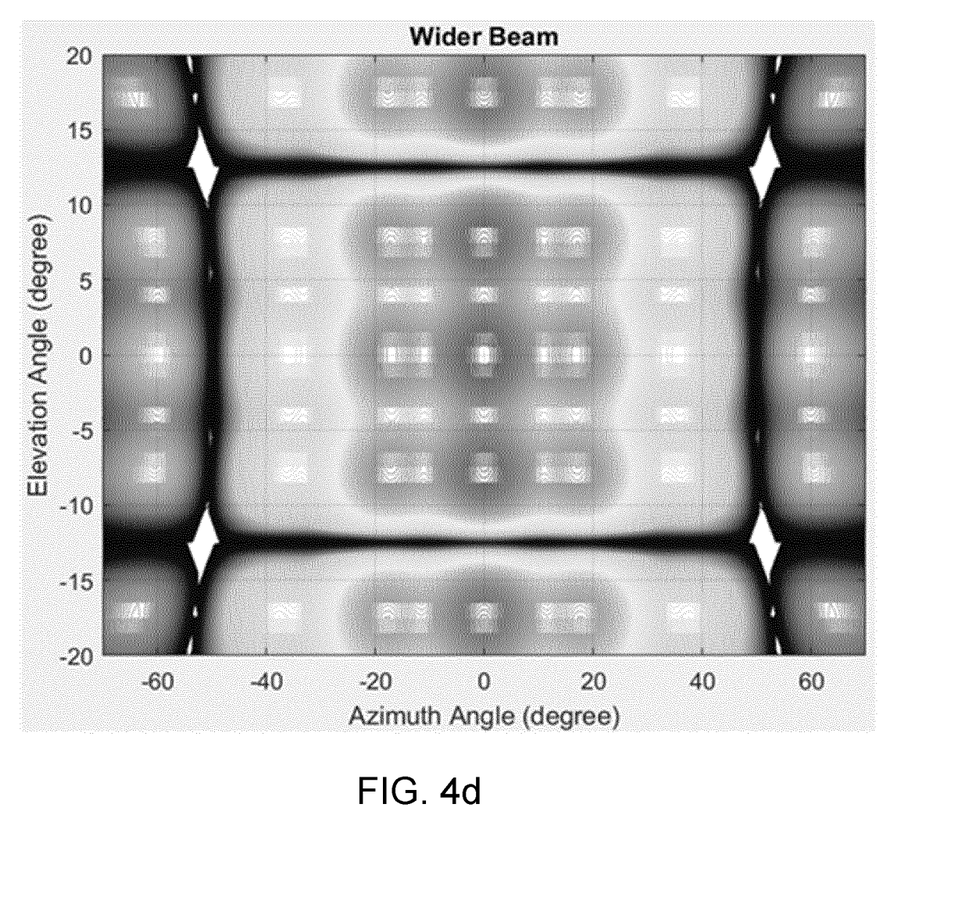
FIG. 4D is a visualization of a wider beam from an example beam dictionary; Like reference numerals are used to designate like parts in the accompanying drawings.

FIG. 3 illustrates an example flow chart of a method 300, in accordance with an example embodiment.

The method 300 may be performed by the network node device 200 of FIG. 2. The operations 301-304 can, for example, be performed by the at least one processor 202 and the at least one memory 204. Further features of the method 300 directly result from the functionalities and parameters of the network node device 200, and thus are not repeated here. The method 300 can be performed by computer program(s).

At operation 301, the network node device 200 may generate a beam dictionary defining a set of beams (or beam set). For example, the set of beams may comprise at least one SSB beam.

The beam dictionary may be created by including a large number of beams with different beam widths and different beam pointing directions. This can be done for example using oversampled discrete Fourier transform (DFT) methods. Example sets of beams that may be created for the beam dictionary are shown in FIGS. 4a to 4d, in which examples of different beam widths are also illustrated. In addition, these beams may be oversampled with more fine-grained beam pointing directions to realize a larger set of beams to achieve large performance gains.

At operation 302, the network node device 200 may estimate a traffic density distribution for a radio channel between the network node device 200 and a client device 210.

The estimate may be based on reports received from the UEs. Each report may include CSI-RS Resource Indicator (CRI) and/or Precoding Matrix Indicator (PMI) (CRI/PMI) precoder information.

In some embodiments, the estimating of the traffic density distribution may comprise determining a spatial direction for the network node device 200. The spatial direction may comprise an azimuth and elevation angle of the angle-of-arrival and/or angle-of-departure at the network node device 200. The estimating of the traffic density distribution may further comprise determining an empirical distribution of a channel matrix of the radio channel in the determined azimuths and elevations.

In other words, the traffic density ρ may be estimated using the client device 210-reported CRI/PMI precoder information. Based on this information, it is possible to determine the azimuth and elevation angle of the angle-of-arrival and/or angle-of-departure at the network node device 200. Based on the number of such measurements in a quantized azimuth and elevation angle space, it is possible to determine an empirical distribution of how the client devices 210 are spread out in elevation and azimuth angles. This may be viewed as estimating the channel matrix H, and determining an empirical distribution on H, or equivalently the azimuth and elevation angles.

For example, during a certain period, each UE reports CRI/PMI precoder information to gNB. The CRI/PMI precoder information is used to approximate the channel through its dominant multi-paths. The traffic density ρ is computed based on the estimation of the channel. For each azimuth/elevation quadruple (az/el quadruple), for both layers, the traffic density ρ describes the expected number of UEs having channel layers aligned in those directions. Such traffic density provides information onto where SSB beams should point to cater to the bulk of the UEs. Traffic density can be estimated at different times of the day and may be specific to, for example, weekday or weekends to account for different traffic patterns (e.g., residential vs. office area).

For example, each UE u may continuously report to gNB the layer channel $H_u^k$, for each UE-reported optimal spatial direction k=1,2. Let A be a pre-defined azimuth/elevation grid (e.g., −70 to 70 in azimuth with interval 2 degree and 0 to 20 deg in elevation with interval 1 degree). Then, over a certain time interval, gNB may cluster UE reports and compute traffic density ρ, where ρ(az$_1$,el$_1$,az$_2$,el$_2$) is proportional to the number of UE reports where (az$_1$,el$_1$) is the closest direction to spatial direction 1 and (az$_2$,el$_2$) is the closest direction to spatial direction 2.

More formally, an oversampled DFT beam set indexed by azimuth az and elevation el, say b(az,el) is defined over grid A. Then, traffic density maps the az/el quadruple az$_1$,el$_1$,az$_2$,el$_2$ for both spatial directions to:

$$\rho(az_1, el_1, az_2, el_2) = \left|\left\{u: (az_u^k, el_u^k) = \underset{(az,el)\in A}{\mathrm{argmax}}\, b(az, el)^H H_u^k, \forall\, k = 1, 2\right\}\right|,$$

$$\forall\, (az_1, el_1, az_2, el_2) \in A \times A$$

Density ρ is then divided by the total number of reports such that it sums up to 1. Traffic density helps to exploit at best the potential of the limited number of SSB beams available and effectively steer the SSB beams in the spatial directions where most UEs are.

At operation 303, the network node device 200 determines, based on the estimated traffic density distribution, a grid of beams.

The grid of beams is determined to maximize a fairness function of an estimated received power of at least two of the beams of the grid of beams that are optimal for each client device of the plurality of client devices 210.

In other words, the high-level objective is to come up with a GoB which guarantees high estimated received power (e.g., RSRP or BF) on the top K beams (i.e., K best beams) across the UEs in a fair manner, with K≥2.

The one or more optimal beams for a client device may be the beams of the GoB that provide the best estimated received power for the client device. In particular, the estimated received power may comprise one or more of a Reference Signal Received Power (RSRP), or a beamforming gain (BF).

In practice, estimating a RSRP for each UE report and beam in the dictionary would require a large effort in a training phase. As such, RSRP may be replaced by beamforming gain (BF). The beamforming gain may be estimated with high fidelity for any beam in the dictionary and in any azimuth/elevation direction with analytical models.

The grid of beams may be determined to maximize the fairness function across a coverage area of a radio cell associated with the network node device.

The beams included in the grid of beams may be selected from the beam dictionary.

The fairness function may comprise an α-fairness (alpha-fairness) function defined as:

$$f^{(\alpha)}(x) = \begin{cases} 10\log_{10}(x) & \text{if } \alpha = 1 \\ \dfrac{x^{1-\alpha}}{1-\alpha} & \text{if } \alpha \geq 0, \alpha \neq 1 \end{cases},$$

where α≥0 is an input parameter.

In some embodiments, the fairness function may ensure fairness across beams for each UE. To that end, the fairness function may comprise, for each client device, a cross-beam fairness function of the estimated received power of the at least two beams of the grid of beams that are optimal for the client device. The cross-beam fairness function may be an α-fairness function. An α parameter of the cross-beam α-fairness function may be equal to 0. In that case, the cross-beam fairness function comprise a sum of the estimated received power of the at least two beams of the grid of beams that are optimal for the client device.

For example, a top-K beams utility $F_B^{topK}(Z)$ (beam utility) for a UE may be obtained by applying the alpha fairness function across beams (cross-beam fairness function) with coefficient abeam. The top-K beams utility $F_B^{topK}(Z)$ for a UE may be expressed as follows:

$$F_B^{topK}(z) = \sum_{k=1}^{K} f^{(\alpha_{beam})}\left(RSRP\left(w_z^{(kth-best,B)}\right)\right).$$

z:=($az_1$, $el_1$, $az_2$, $el_2$) is the generic azimuth/elevation quadruple. RSRP the estimated received power. RSRP may be replaced by a beamforming gain.

$w_z^{(kth-best,B)}$ is the kth best beam of the GoB B.

K≥1 is configurable. In some embodiments, K=2.

$f^{(\alpha_{beam})}$ is the α-fairness function.

$\alpha_{beam}$≥0 is a configurable parameter. $\alpha_{beam}$ can be set according to the following reasoning. If $\alpha_{beam}$=0, the function $F_B^{topK}(z)$ just accounts for the sum of RSRP in linear. This may be the default value, since it theoretically allows to maximize throughput. As $\alpha_{beam}$ increases the function $F_B^{topK}(z)$, if maximized, favors the GoB guaranteeing more and more similar RSRP over the top K beams (i.e., K best beams). The rationale behind this choice is to ensure that each UE has always at least one beam with high RSRP available for transmission.

In some embodiments, the fairness function may ensure fairness across UEs. To that end, the fairness function may comprise a cross-device fairness function of the cross-beam fairness function for each client device of the plurality of client devices. The cross-device fairness function may be an α-fairness function. An α parameter of the cross-beam α-fairness function may be equal to 1. In that case, the cross-device function may comprise a sum, across a plurality of azimuth and elevation quadruples, of a decibel of the cross-beam fairness function for each client device of the plurality of client devices weighted by a traffic density value in the azimuth and elevation quadruple.

In some embodiments, the overall objective function for the fairness across UEs (cross-device fairness function) may be defined as the sum across azimuth/elevation quadruples of the alpha-fairness function of the top-K beams utility $F_B^{topK}(z)$, weighted by the traffic density value in each quadruple z:

$$\sum_{z \in A \times A} \rho(z) f^{(\alpha_{ue})}(F_B^{topK}(z))$$

$\alpha_{ue}$ is a configurable parameter and can be set according to the following reasoning. The case $\alpha_{ue}$=0 corresponds to the plain sum of beam utilities. $\alpha_{ue}$=1 amounts to the conversion in dB of beam utilities. As $\alpha_{ue}$ increases, the objective function, if maximized, tends to guarantee more and more similar RSRP across all UEs.

In some embodiments, $\alpha_{beam}$=0, $\alpha_{ue}$=1. These parameters maximize the weighted sum of the dB conversion of the sum of RSRP over the top K beams (K best beams).

If $\alpha_{ue}$>0, then $\alpha_{beam}$<1, since otherwise $F_B^{topK}(z)$ is negative.

The estimated received power may comprise one or more of an estimated received power (RSRP), or a beamforming gain (BF).

In practice, estimating a RSRP for each UE report and beam in the dictionary would require a large effort in a training phase. As such, RSRP may be replaced by beamforming gain (BF). The beamforming gain may be estimated with high fidelity for any beam in the dictionary and in any azimuth/elevation direction with analytical models.

The fairness function may be maximized using an optimization algorithm. For example, the optimization algorithm may comprise a greedy algorithm configured to sequentially add beams maximizing incremental gain.

Alternatively, and/or additionally, the optimization algorithm may comprise a policy improvement algorithm configured to iteratively choose a beam maximizing the performance of the greedy algorithm.

More specifically, the policy improvement algorithm may be configured to iteratively select the beams at subsequent steps and use the greedy algorithm as a sub-routine. At each step, given that a set B of beams has already been selected, the policy improvement algorithm may select the beams b that maximize the utility of the beam set obtained by adding the beam b to B and then following with the greedy algorithm that sequentially adds beams maximizing an incremental gain, until a full beam set is obtained.

The objective function $$J(B) := \sum_{z \in A \times A} \rho(z) f^{(\alpha_{ue})}(F_B^{topK}(z))$$

is monotone, in the sense that as the set of beams enlarges, utility increases. The objective function $$J(B) := \sum_{z \in A \times A} \rho(z) f^{(\alpha_{ue})}(F_B^{topK}(z))$$

is submodular, in the sense that as the set of beams enlarges, the incremental gain of adding one more beam decreases.

A greedy algorithm that sequentially adds the beam maximizing the incremental utility gain has tight performance guarantees (e.g., the optimality gap is 1/e).

An example greedy algorithm may comprise, e.g.:
a) Start with the empty SSB GoB B=Ø.
b) Compute $$b^* = \arg\max_b J(B \cup b) - J(B)$$

the beam achieving highest performance incremental gain
c) Add b* to B and continue until B has the wanted size N.

Greedy algorithms have low complexity, in the order of O(beamsetsize×dictionary size), and may run in a few tens of milliseconds in realistic scenarios.

As discussed above, the optimization algorithm may comprise a policy improvement algorithm. At least some policy improvement algorithms may build on top of the greedy algorithm and improve its performance, thereby allowing achieving an improved complexity vs. performance trade-off.

For example, Q(B,b) may be defined as the performance achieved by starting from a beam set B, adding beam b and then completing the beam set (up to the wanted size, e.g., 4) by the above greedy algorithm. Then, the policy improvement algorithm may prescribe to choose the beam b maximizing Q in an iterative fashion.

An example of the policy improvement algorithm may comprise, e.g.:
1) start with the empty beam set B=Ø,
2) compute $$b^* = \arg\max_b Q(B, b),$$

and
3) add b* to B and continue until B has the wanted size (e.g., 4).

In at least some embodiments, the performance of the policy-improvement algorithm may be superior to that of the greedy algorithm. On the other hand, in at least some embodiments, the complexity of the policy-improvement algorithm is higher than that of the greedy algorithm (in fact, the greedy algorithm is a sub-routine of the policy-improvement algorithm), being in the order of $O((\text{beamsize})^2 \times (\text{dictionary size})^2)$. However, in realistic scenarios, the policy-improvement algorithm may be able to provide a solution in around one minute. This is affordable, since the beam set needs only to be recomputed when the traffic density is deemed to have changed considerably, which may occur on a longer time scale (e.g., hours).

In some embodiments, one or more beams may be reserved to coverage-only purposes. For example, $N_{coverage} < N$ beams (where N is the overall number of beams) can be reserved to coverage-only purposes. In this case, the first $N - N_{coverage}$ beams may be computed with the method above and the GoB B* is produced. Then, $\alpha_{ue}$ may be set to a predetermined value (e.g., 5). The last $N_{coverage}$ beams may be optimized with the same algorithms as above, with the exception that in step 1) of greedy or policy improvement the initial GoB is B*, and the traffic density is set to a constant value everywhere.

At operation 304, the network node device 200 may apply the grid of beams to the transceiver antenna array 206 of the network node device 200.

The network node device 200 may comprise means for performing at least one method described herein. In an example, the means may comprise the at least one processor 202, and the at least one memory 204 including program code configured to, when executed by the at least one processor 202, cause the network node device 200 to perform the method.

The functionality described herein can be performed, at least in part, by one or more computer program product components such as software components. According to an embodiment, the network node device 200 may comprise a processor or processor circuitry, such as for example a microcontroller, configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and Graphics Processing Units (GPUs).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A network node device comprising:
at least one processor; and
at least one memory including computer program code;
where the at least one memory and the computer program code are configured to, with the at least one processor, cause the network node device to perform operations comprising:
determining a grid of beams, wherein the grid of beams is determined to maximize a fairness function of an estimated received power of at least two of the beams of the grid of beams that are optimal for each client device of a plurality of client devices, wherein the fairness function comprises, for each client device, a cross-beam fairness function of the estimated received power of the at least two beams of the grid of beams that are optimal for the client device, and wherein the determining of the grid of beams comprises using an optimization algorithm comprising a greedy algorithm configured to sequentially add beams maximizing incremental gain.

2. The network node device according to claim 1, wherein the cross-beam fairness function is an $\alpha$-fairness function.

3. The network node device according to claim 2, wherein an $\alpha$ parameter of the cross-beam $\alpha$-fairness function is equal to 0, and wherein the cross-beam fairness function comprises a sum of the estimated received power of the at least two beams of the grid of beams that are optimal for the client device.

4. The network node device according to claim 1, wherein the fairness function comprises a cross-device fairness function of the cross-beam fairness function for each client device of the plurality of client devices.

5. The network node device according to claim 4, wherein the cross-device fairness function is an $\alpha$-fairness function.

6. The network node device according to claim 5, wherein an $\alpha$ parameter of the cross-beam $\alpha$-fairness function is equal to 1.

7. The network node device according to claim 6, wherein the cross-device function comprises a sum, across a plurality of azimuth and elevation quadruples, of a decibel of the cross-beam fairness function for each client device of the plurality of client devices weighted by a traffic density value in the azimuth and elevation quadruple.

8. The network node device according to claim 7, wherein the operations further comprise:
estimating a traffic density distribution for a radio channel between the network node device and the plurality of client devices, the traffic density distribution defining the traffic density value for each azimuth and elevation quadruple of the plurality of azimuth and elevation quadruples.

9. The network node device according to claim 8, wherein estimating the traffic density distribution comprises:
receiving, from the client devices, a plurality of reports, each report indicating a spatial direction for one of the client devices;
clustering the reports; and
computing the traffic density distribution based on the clustered reports.

10. The network node device according to claim 1, wherein the estimated received power comprises one or more of an estimated received power, or a beamforming gain.

11. The network node device according to claim 1, wherein the optimization algorithm comprises a policy improvement algorithm configured to iteratively choose a beam maximizing a performance of the greedy algorithm.

12. The network node device according to claim 1, the operations further comprising:
applying the grid of beams to a transceiver antenna array of the network node device.

13. The network node device according to claim 1, the operations further comprising:
generating, by the network node device, a beam dictionary, wherein the grid of beams is selected from the beam dictionary.

14. The network node device according to claim 1, wherein the grid of beams comprises a plurality of Synchronization Signal Block beams.

15. A method comprising:
determining a grid of beams, wherein the grid of beams is determined to maximize a fairness function of an estimated received power of at least two of the beams of the grid of beams that are optimal for each client device of a plurality of client devices, wherein the fairness function comprises, for each client device, a cross-beam fairness function of the estimated received power of the at least two beams of the grid of beams that are optimal for the client device, and wherein the determining of the grid of beams comprises using an optimization algorithm comprising a greedy algorithm configured to sequentially add beams maximizing incremental gain.

16. A non-transitory computer readable medium comprising instructions for causing a network node device to perform at least the following:
determining a grid of beams, wherein the grid of beams is determined to maximize a fairness function of an estimated received power of at least two of the beams of the grid of beams that are optimal for each client device of a plurality of client devices, wherein the fairness function comprises, for each client device, a cross-beam fairness function of the estimated received power of the at least two beams of the grid of beams that are optimal for the client device, and wherein the determining of the grid of beams comprises using an optimization algorithm comprising a greedy algorithm configured to sequentially add beams maximizing incremental gain.

* * * * *